(12) United States Patent
Moskowitz

(10) Patent No.: US 9,137,216 B2
(45) Date of Patent: Sep. 15, 2015

(54) SESSION LAYER DATA SECURITY

(71) Applicant: Verizon Patent and Licensing Inc., Basking Ridge, NJ (US)

(72) Inventor: Robert Moskowitz, Oak Park, MI (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/266,022

(22) Filed: Apr. 30, 2014

(65) Prior Publication Data
US 2015/0052348 A1 Feb. 19, 2015

Related U.S. Application Data

(60) Provisional application No. 61/865,267, filed on Aug. 13, 2013.

(51) Int. Cl.
*H04L 29/06* (2006.01)
(52) U.S. Cl.
CPC .................................. *H04L 63/0428* (2013.01)
(58) Field of Classification Search
None
See application file for complete search history.

(56) References Cited

U.S. PATENT DOCUMENTS

| | | | |
|---|---|---|---|
| 6,931,574 B1* | 8/2005 | Coupal et al. | 714/39 |
| 8,379,638 B2* | 2/2013 | Swartz | 370/389 |
| 8,549,614 B2* | 10/2013 | Kumar et al. | 726/14 |
| 8,654,635 B2* | 2/2014 | Yonge et al. | 370/230 |
| 2001/0023482 A1* | 9/2001 | Wray | 713/151 |
| 2008/0019391 A1* | 1/2008 | Breitkreutz | 370/466 |
| 2011/0170545 A1* | 7/2011 | Zheng et al. | 370/392 |
| 2012/0036363 A1* | 2/2012 | Langham et al. | 713/171 |
| 2014/0086091 A1* | 3/2014 | Shen et al. | 370/252 |
| 2014/0112354 A1* | 4/2014 | Yin | 370/476 |
| 2015/0033311 A1* | 1/2015 | Seed et al. | 726/7 |

* cited by examiner

*Primary Examiner* — Jeffrey Pwu
*Assistant Examiner* — William Corum, Jr.

(57) ABSTRACT

A first application at a first device selects one of multiple encapsulation format types based on a cost or bandwidth associated with a network, or associated with a link of the network, connected between the first application at the first device and a second application at a second device. The first application receives, at the first application from Open Systems Interconnection (OSI) layers above an OSI session layer, payload data associated with a session, and generates one or more session layer encapsulated blocks of the payload data using the selected one of the multiple encapsulated format types. The first application encrypts the payload data, and other data of the one or more session layer encapsulated blocks, and passes the encrypted session layer encapsulated block to OSI layers below the session layer for sending to the second application at the second device.

25 Claims, 11 Drawing Sheets

SESSION LAYER DATA SECURITY

CROSS-REFERENCE TO RELATED APPLICATION

This application claims priority under 35 U.S.C. §119, based on U.S. Provisional Application No. 61/865,267, filed Aug. 13, 2013, the disclosure of which is hereby incorporated by reference herein.

BACKGROUND

The Open Systems Interconnection (OSI) model is a model that standardizes the internal functions of a communication system by partitioning it into abstraction layers. The OSI model groups similar communication functions into one of seven different logical layers. Each layer, except the top layer, serves the layer above it, and each layer, except the bottom layer, is served by the layer below it. The seven layers of the OSI model include, from top layer #7 to bottom layer #1, the application layer, the presentation layer, the session layer, the transport layer, the network layer, the data link layer, and the physical layer. The application, presentation, session and transport layers comprise the host layers, and the network, data link and physical layers comprise the media layers. The application, presentation and session layers handle/process service data units (SDUs) that comprise merely data. The transport layer handles/processes SDUs that comprise segments. The network layer handles/processes SDUs that comprise packets/datagrams. The data link layer handles/processes SDUs that comprise bits and frames. The physical layer handles/processes SDUs that comprise bits. A SDU is a specific unit of data that has been passed down from a higher OSI layer to a lower OSI layer, and which the lower layer has not yet encapsulated into a protocol data unit (PDU). The SDU at a layer N, is the PDU of layer N+1. The OSI layer N−1 adds headers and/or footers, to the SDU to transform it into a PDU of layer N−1. The added headers and/or footers make it possible to get the data from a source network node to a destination network node.

The application layer interacts directly with the software application and typically involves functions such as identifying communication partners, determining resource availability, and synchronizing communication. In Transmission Control Protocol (TCP)/Internet Protocol (IP), application layer implementations may include Hypertext Transfer Protocol (HTTP), File Transfer Protocol (FTP), Simple Mail Transfer Protocol (SMTP), and Simple Network Management Protocol (SNMP). The presentation layer establishes context between application-layer entities and translates between application and network formats. The presentation layer formats and encrypts data to be sent across a network.

The session layer controls the connections between endpoint network nodes. The session layer establishes, manages and terminates the connections between the local and remote application. The transport layer provides the reliable communication of data between nodes located on a network. The transport layer controls the reliability of a given link through flow control, segmentation/desegmentation, and error control. The network layer transfers variable length data sequences (i.e., datagrams) from one node to a next node in a network. The network layer provides mechanisms for routing messages in the network. The data link layer provides a reliable link between two directly connected nodes by detecting and correcting errors that occur in the physical layer. The physical layer performs a number of functions, including defining the electrical and physical specification of the data connection, defining the protocol to establish and terminate a connection, defining the protocol for flow control, and defining a protocol for the provision of a connection between two directly connected nodes.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein implement a minimalistic message security service that operates at the session layer in the OSI layer model. The session layer security service described herein provides message security above—and decoupled from—the transport layer. The session layer security service provides any communicating application with standardized message security encapsulation formats, wherein one of the different message encapsulation format types may be selected for use at the session layer based on the cost or bandwidth constraints of the transporting network. Since different data links of the transporting network may place different costs for each byte of data, the ability to select different message encapsulation format types for each session layer message block contributes to the ability to conserve network resources by reducing network costs. In the situation of data links that place a significant cost for each byte of payload data, then a more compact encapsulation format type can be selected to conserve network resources. In the situation of data links that have very high bandwidth, then larger, less compact encapsulation format types may be selected since network resources do not necessarily need to be conserved.

Figure 1:
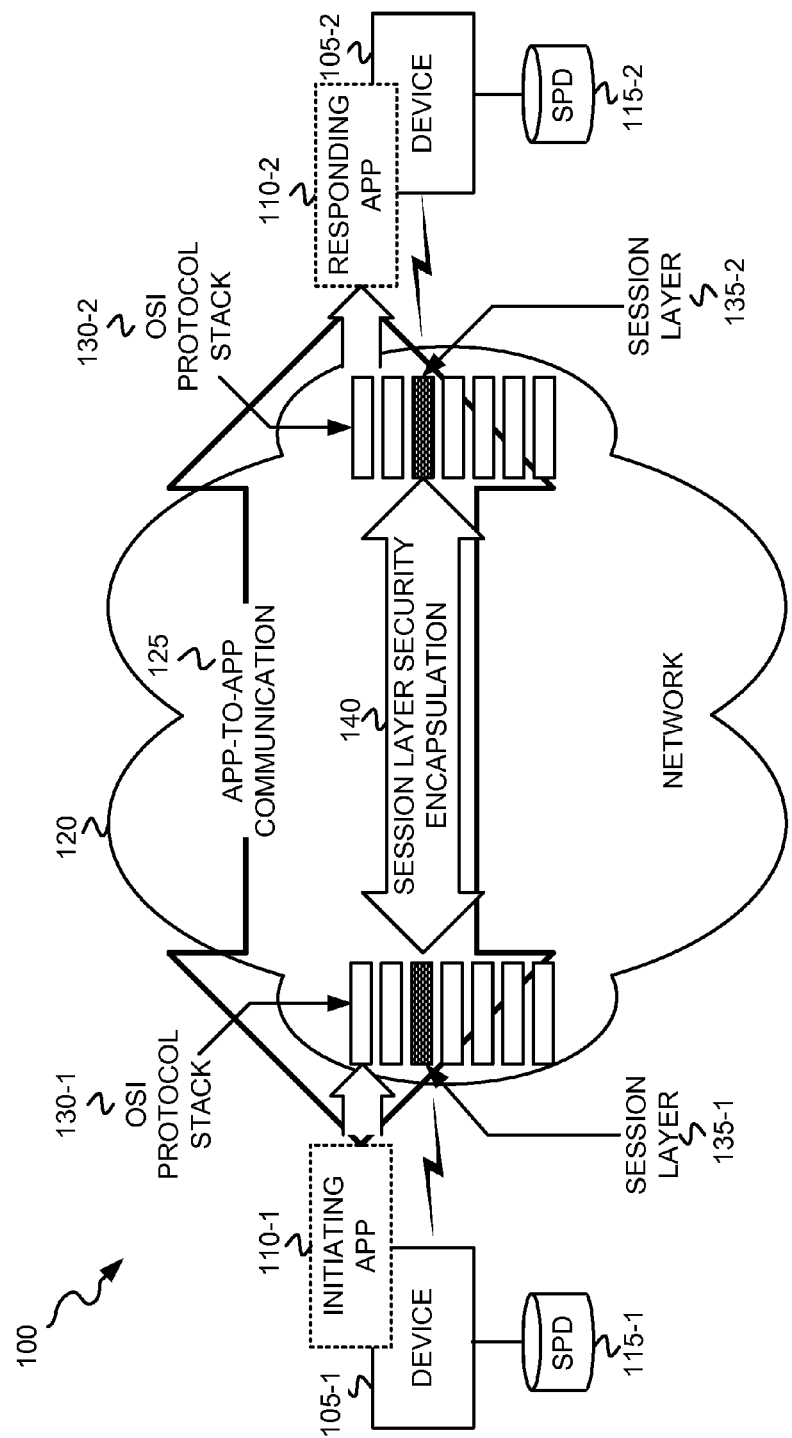
FIG. 1 depicts an exemplary network environment in which new message security protocols are implemented at the OSI session layer to provide session level security between two communicating applications.

FIG. 1 depicts an exemplary network environment 100 in which new message security protocols are implemented at the OSI session layer to provide session level security between two communicating applications. Network environment 100 may include a device 105-1, executing an initiating application (app) 110-1, and another device 105-2, executing a responding app 110-2. Network environment 100 may further include a security policy database (SPD) 115-1 coupled with device 105-1, SPD 115-2 coupled with device 105-2, and network 120. When engaged in app-to-app communication 125 between initiating app 110-1 and responding app 110-2 via network 120, a session layer 135-1 of OSI protocol stack 130-1 at initiating app 110-1, and a session layer 135-2 of OSI protocol stack 130-2 at responding app 110-2 may use new session layer protocols, described further herein, to implement session layer security encapsulation 140 for securing session layer payload data sent from initiating app 110-1 to responding app 110-2. As described further herein, session layer security encapsulation 140 may be implemented using multiple different types of encapsulation format types that are selected by initiating app 110-1 and/or responding app 110-2 based on bandwidth and/or cost constraints of network 120, or bandwidth and/or cost constraints of one or more links of network 120, connected between devices 105-1 and 105-2.

Devices 105-1 and 105-2 (generically and individually referred to herein as "device 105" and collectively referred to herein as "devices 105") may each include any type of electronic device that may communicate via network 120 using a wired or wireless connection. Devices 105-1 and 105-2 may each include, for example, a cellular telephone (e.g., a smart phone), a personal digital assistant (PDA), or a computer (e.g., tablet, desktop, palmtop, or laptop). A device user (not shown) may be associated with each of devices 105-1 and 105-2.

SPDs 115-1 and 115-2 (generically and individually referred to herein as "SPD 115" and collectively referred to herein as "SPDs 115") may each include memory storage devices (e.g., network devices having memory storage for storing data structures) that may store data structures associated with a SPD. Each SPD may store information for each session, between initiating app 110-1 and responding app 110-2, associated with security to be applied at the session layer to session level payload data communicated between app 110-1 and app 110-2.

Network 120 may include one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). Network nodes of network 120 may implement network protocols that conform to the OSI model and may communicate using, for example, packet-switched connections. In some implementations, network 120 may be cost or bandwidth constrained. For example, if network 120 includes a satellite or cellular Short Messaging Service (SMS) network, than monetary cost may be a constraint. In another example, if network includes an IEEE 802.15.4 k or 802.15.6 network, then energy and/or time may be a constraint. In other implementations, all or portions of network 120 may have high bandwidths and, therefore, may not be cost or bandwidth constrained.

The configuration of network components of network environment 100 illustrated in FIG. 1 is for illustrative purposes. Other configurations may be implemented. Therefore, network environment 100 may include additional, fewer and/or different components that may be configured in a different arrangement than those depicted in FIG. 1. For example, only two devices 105-1 and 105-2, and two applications 110-1 and 110-2, are depicted in FIG. 1. However, multiple different devices 105 and apps 110 may communicate via network 120.

Figure 2:
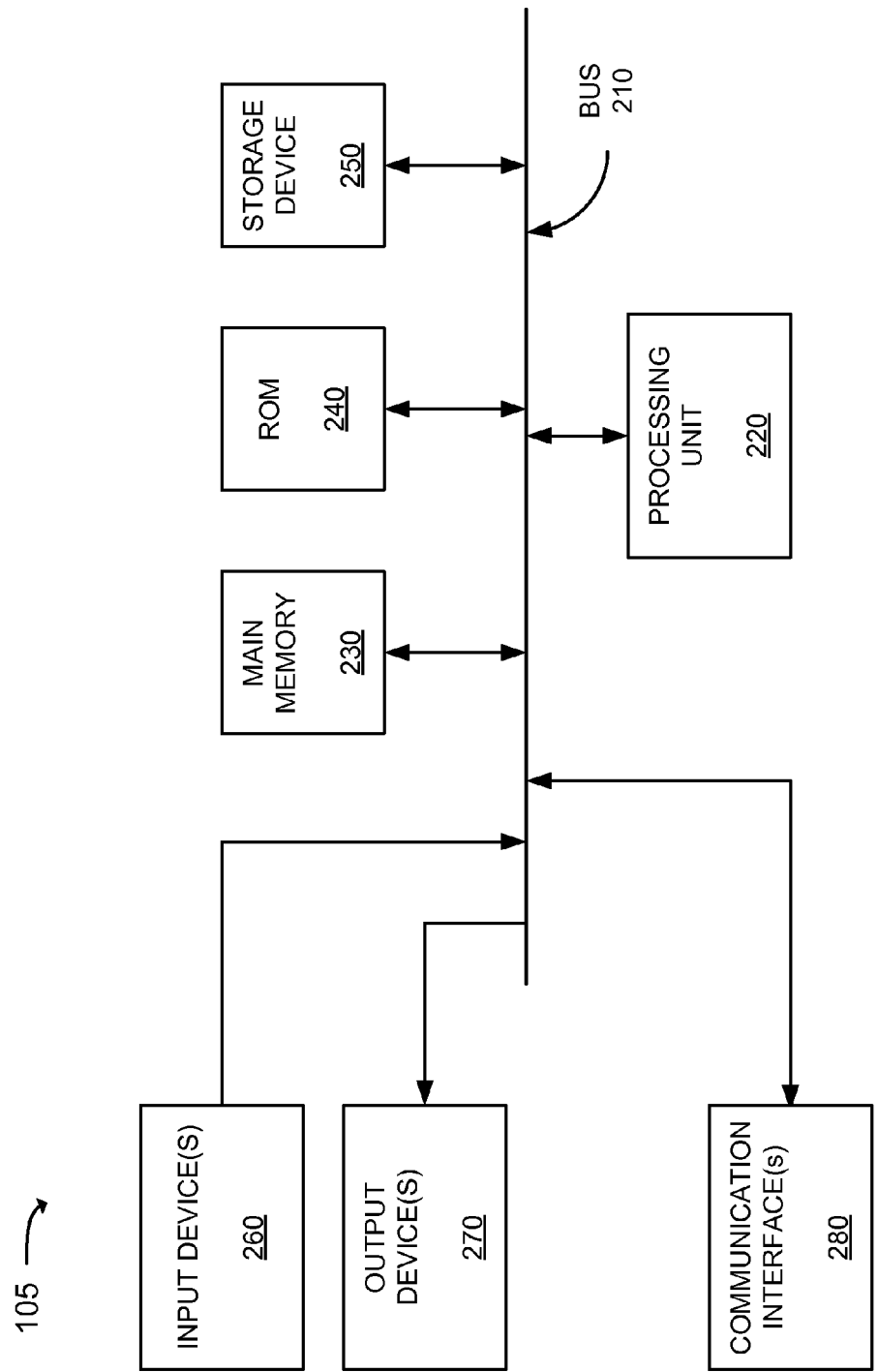
FIG. 2 is a diagram that depicts exemplary components of a device of FIG. 1.

FIG. 2 is a diagram that depicts exemplary components of a device 105. SPDs 115 may be similarly configured. Device 105 may include a bus 210, a processing unit 220, a main memory 230, a read only memory (ROM) 240, a storage device 250, an input device 260, an output device 270, and a communication interface 280. Bus 210 may include a path that permits communication among the components of device 105.

Processing unit 220 may include one or more processors or microprocessors, or processing logic, which may interpret and execute instructions. Main memory 230 may include a random access memory (RAM) or another type of dynamic storage device that may store information and instructions for execution by processing unit 220. ROM 240 may include a ROM device or another type of static storage device that may store static information and instructions for use by processing unit 220. Storage device 250 may include a magnetic and/or optical recording medium. Main memory 230, ROM 240 and storage device 250 may each be referred to herein as a "tangible, non-transitory computer-readable medium." The processes/methods described herein can be implemented as instructions that are stored in main memory 230, ROM 240 and/or storage device 250 for execution by processing unit 220.

Input device 260 may include one or more mechanisms that permit an operator to input information to device 105, such as, for example, a keypad or a keyboard, a display with a touch sensitive panel, voice recognition and/or biometric mechanisms, etc. Output device 270 may include one or more mechanisms that output information to the operator, including a display, a speaker, etc. Input device 260 and output device 270 may, in some implementations, be implemented as a user interface (UI) that displays UI information and which receives user input via the UI. Communication interface(s) 280 may include a transceiver that enables device 105 to communicate with other devices and/or systems. For example, communication interface(s) 280 may include wired or wireless transceivers for communicating via network 120.

The configuration of components of device 105 illustrated in FIG. 2 is for illustrative purposes. Other configurations may be implemented. Therefore, device 105 may include additional, fewer and/or different components than those depicted in FIG. 2.

Figure 3:
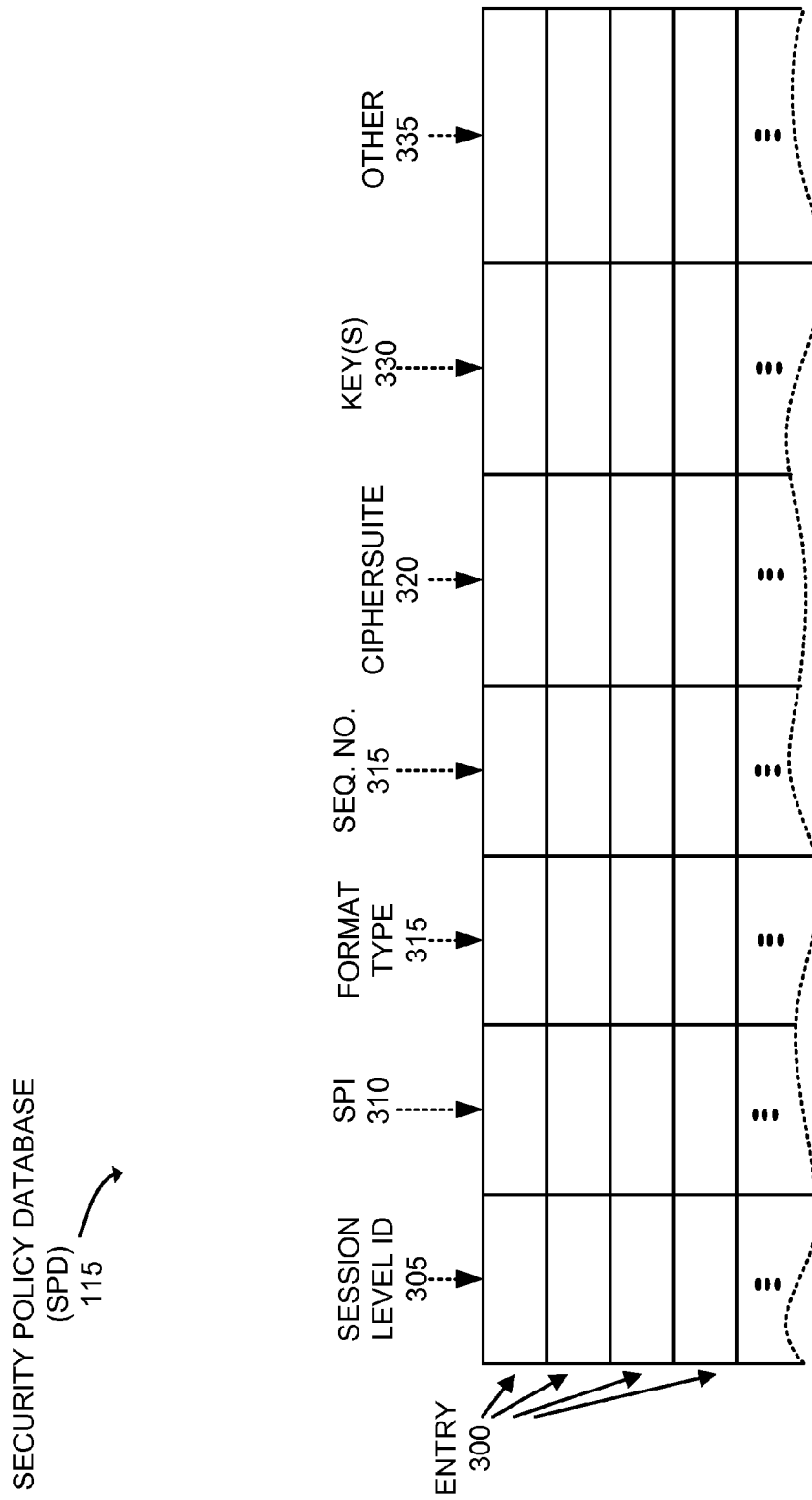
FIG. 3 depicts an exemplary data structure that corresponds to the Security Policy Database of FIG. 1.

FIG. 3 depicts an exemplary data structure that corresponds to SPD 115. SPD 115 is shown in FIG. 3 as a tabular data structure. However, other types of data structures may alternatively be used. SPD 115 may include multiple entries 300, each of which includes a session level identifier (ID) field 305, a security parameters index (SPI) field 310, a format type field 315, a sequence number field 315, a ciphersuite field 320, an encryption key(s) field 330, and an other field 335.

Session level ID field 305 may include a unique identifier for identifying a session between app 110-1 and 110-2. Various types of cryptographic algorithms may be applied to any type of identifier for app 110 or device 105 to generate the unique session level ID. The unique identifier may include, for example, data resulting from a cryptographic algorithm applied to a network address of device 105. In some implementations, for example, the network address may include an Internet Protocol (IP) address of device 105.

SPI field 310 may include a unique bit string that is assigned for each session level ID identified in a corresponding session level ID field 305, and for each transmitting app 110 engaged in the session identified by field 310. Each SPI may include a randomly generated bit string. In one implementation, each SPI may include 32 bits.

Format type field 315 may uniquely identify one of multiple different format types that may be used at the session layer for encapsulating session layer payload data. Each of the multiple different format types may include a different number and/or length of fields used in the encapsulation overhead data that encapsulated the session layer payload data. Payload data lengths may vary from small to very large lengths, and bandwidths/costs associated with network 120, or network 120's links, may vary from highly constrained to very high bandwidth. Therefore, payload data in each session may be encapsulated using different encapsulation format types.

Sequence number field 320 may includes a set of bits that identify a sequence number, for maintaining the synchronization, of session layer blocks of data in a session between two communicating applications (e.g., app 110-1 and app 110-2). The number of bits in the sequence number may vary based on the encapsulation format type identified in corresponding format type field 315. The value for the sequence number stored in field 320 may be incremented as each block of session layer data in a given session is sent from an application to another application.

Ciphersuite field 325 may identify the specific combination of authentication, encryption and/or message code authentication (MAC) algorithms used for securing session layer data communicated between two communicating applications (e.g., app 110-1 and app 110-2). Selection of the ciphersuite identified in ciphersuite field 325 may be negotiated between the two communicating apps, or may be specified by, for example, network policy.

Encryption key(s) field 330 may store an encryption key used for encrypting portions of the session layer data (e.g., payload data, padding data, and padding length data) transmitted from an application (e.g., app 110-1) to another application (e.g., app 110-2). Other field 335 may include other data, other than that described with respect to fields 305-330, that may be used for securing session layer transmitted from an application to another application.

The number and content of the fields of the tabular data structure of SPD 115 illustrated in FIG. 3 is for illustrative purposes. Other data structures having a different structure or fewer, more, and/or one or more different types of fields may be implemented as compared to that depicted in FIG. 3.

Figure 4:
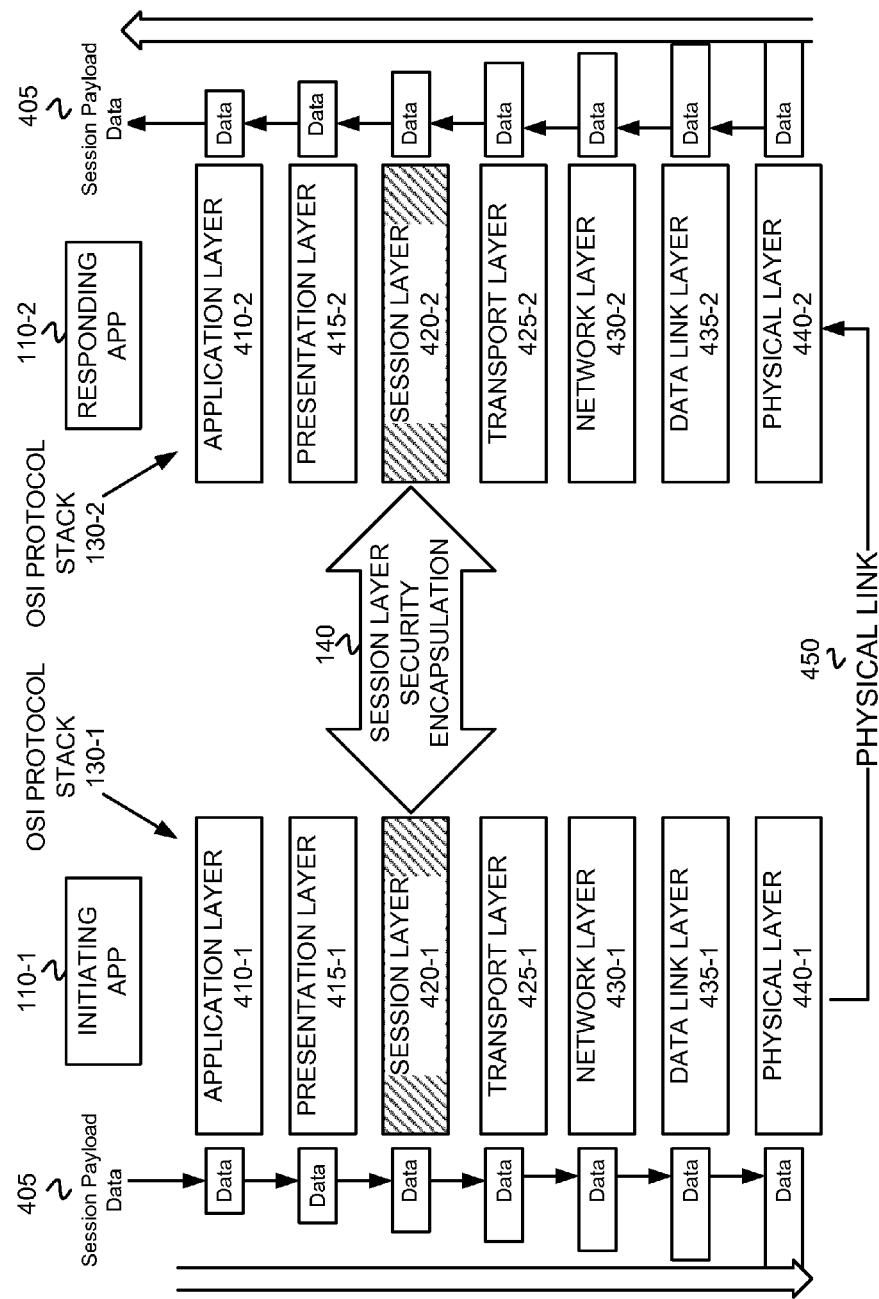
FIG. 4 depicts the implementation of a session layer security data security service, in the context of the OSI model, between the two communicating applications of FIG. 1 according to an exemplary embodiment.

FIG. 4 depicts the implementation of a session layer data security service, in the context of the OSI model, between the communicating applications 110-1 and 110-2 according to an exemplary embodiment. As shown in FIG. 4, session payload data 405 may originate at initiating application 110-1, and may be processed via the layers of OSI protocol stack 130-1. The highest layer, the application layer 410-1, interacts directly with application 110-1 and performs functions such as identifying communication partners, determining resource availability, and synchronizing communication. Application layer 410-1 receives session payload data 405 as the service data unit (SDU), encapsulates session payload data 405, and passes the encapsulated data down to presentation layer 415-1 as a protocol data unit (PDU).

Presentation layer 415-1 receives the PDU from application layer 410-1 as a SDU and translates data of the SDU between application and network formats. Presentation layer 415-1 formats and encrypts the data of the SDU to be sent across network 120. Presentation layer 415-1 the SDU, encapsulates the SDU, and passes the encapsulated SDU to session layer 420-1 as a PDU.

Session layer 420-1 controls the connections between initiating app 110-1 and responding app 110-2, and establishes, manages and terminates the connections between the app 110-1 and app 110-2. Session layer 420-1 receives the PDU from presentation layer 415-1 as a SDU, and implements a session layer data security service that, among other functions, performs a session layer security encapsulation 140 of the received SDU. The functions of session layer 420-1 are described herein and include generating a security parameter index (SPI) for each session; exchanging the SPI, using a key management protocol (KMP), with app 110-2; negotiating, using the KMP, the selection of a SSE encapsulation format type (e.g., corresponding to message blocks 500, 600 or 700 below) and a ciphersuite with app 110-2; obtaining, using the KMP, an encryption key for the session; creating an entry for the session in SPD 115-1; encapsulating session payload data based on the selected encapsulation format type; encrypting the portions of the encapsulated data using the session encryption key and based on the encryption algorithm specified in the ciphersuite; and passing the SSE security encapsulated data down to transport layer 425-1 as a PDU. Various different types of KMPs may be used, with different length SPIs.

Transport layer 425-1 receives the PDU from session layer 420-1 as a SDU. Transport layer 425-1 provides the reliable communication of data between apps 110-1 and 110-2 over network 120, and controls the reliability of a given link through flow control, segmentation/desegmentation, and error control. Transport layer 425-1 encapsulates the SDU and passes the SDU down to network layer 430-1 as a PDU. Network layer 430-1 receives the PDU from transport layer 425-1 as a SDU. Network layer 430-1 provides mechanisms for routing the SDU in network 120. Network layer 430-1 encapsulates the SDU and passes the SDU down to data link layer 435-1 as a PDU.

Data link layer 435-1 receives the PDU from network layer 430-1 as a SDU. Data link layer 435-1 provides a reliable link, between device 105-1 that executes application 110-1 and a next node (not shown) in network 120 towards, or in the route to, device 105-2 that executes application 110-2, by detecting and correcting errors that occur in physical layer 440-1. Data link layer 435-1 encapsulates the SDU and passes the SDU down to physical layer 440-1 as a PDU. Physical layer 440-1, the lowest layer, performs a number of functions, including defining the electrical and physical specification of the data connection, defining the protocol to establish and terminate a connection, defining the protocol for flow control, and defining a protocol for the provision of a connection between device 105-1 that executes application 110-1 and a network node directly connected to device 105-1 via physical link 450.

Upon receipt of the encapsulated data from app 110-1 via physical link 450, OSI protocol stack 130-2 at responding app 110-2 decapsulates and processes the encapsulated data to extract the session payload data 405 in an inverse order, as shown in FIG. 4, of OSI layers as compared to the description above with respect to application 110-1.

Many existing networks are highly constrained in terms of cost and/or bandwidth and, therefore, have a high cost per byte for transmitted data. In the future, very high bandwidth networks are expected to be more widespread. Therefore, to accommodate a wide range of network cost/bandwidth environments, the session layer data security service described herein includes multiple different security encapsulation format types that each has different total bit lengths. In one implementation, three different encapsulation format types may be used in the session layer data security service described herein, including a large format, a compact format, and an optional extreme format. In other implementations, four or more different encapsulation format types may be used in the session layer data security service described herein. For example, a fourth encapsulation format type may only include a sequence number and an integrity check value (i.e., a two byte overhead beyond the cleartext size), as opposed to the other additional fields depicted with respect to FIGS. 5-7 below. The fourth encapsulation format type may, for example, include a greater quantity of data overhead than the first, second and third format types (e.g., the three types depicted in FIGS. 5-7). The different bit lengths of the multiple different encapsulation format types enable the multiple different security encapsulation format types to be selected based on the cost/bandwidth constraints of the network/network links. In additional implementations, the number and the types of fields, and the overall format, of the multiple different encapsulation format types may be different than those described below with respect to FIGS. 5-7.

Figure 5:
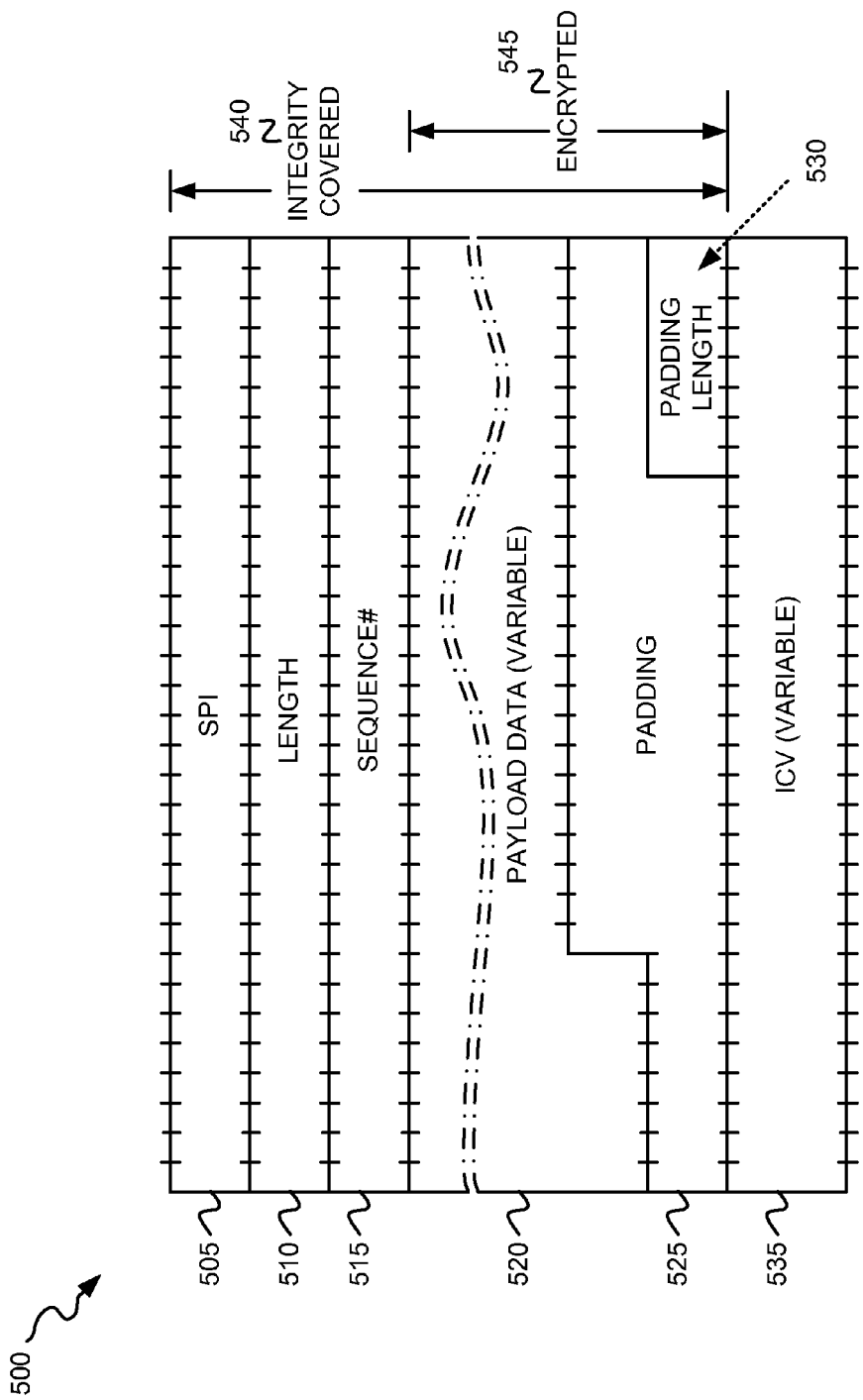
FIG. 5 illustrates an exemplary format of a "large" session security envelope message block used for communicating between two applications at the session layer.

FIG. 5 illustrates an exemplary format of a "large" session security envelope (SSE) message block 500 used for communicating between two applications at the session layer. Message block 500, in the exemplary "large" format of FIG. 5, may include a SPI field 505, a length field 510, a sequence number (#) field 515, a payload data field 520, a padding field 525, a padding length field 530, and an integrity check value (ICV) field 535.

SPI field 505 may include the unique bit string that is assigned to the current session of which message block 500 is a part, and to the app 110 that transmitted message block 500. In the embodiment depicted in FIG. 5, the unique bit string stored in SPI field 505 may include 32 bits. Length field 510 may specify a bit length of message block 500. In one implementation, length field 510 may have a length of 20 bits. Sequence number (#) field 515 may indicate a current sequence number assigned to message block 500 within the session of which message block 500 is a part. The sequence number indicated in field 515 may be used for synchronizing the current message block 500 with other messages in the session. In this "large" format SSE message block 500, the sequence number stored in field 515 may have a length of 64 bits.

Payload data field 520 may include the session layer payload data for message block 500. Payload data field 520 may include a variable number of bytes of data. Padding field 525 may include a variable number of bytes, such that the variable number of bytes of payload data combined with the variable number of bytes of padding equal a fixed number of bytes. Padding length field 530 includes bits of data that specify the byte length of the padding data stored in padding field 525. Padding field 525 and padding length field 530 may, in some implementations, be optional. Integrity Check Value (ICV) field 535 includes an ICV value that has been generated, based on the content of fields 505-525 of message block 500, to produce a block of data that can be used to detect errors in message block 500 that may occur during message transmission or storage. Various different cryptographic integrity checking algorithms may be used to generate the ICV value stored in field 535, such as, for example, a cipher block chaining message authentication code (CBC-MAC) algorithm. Other types of cryptographic integrity checking techniques may alternatively be used. The ICV generated by the ICV algorithm and stored in field 535 may include, for example, an 8 or 12 byte ICV.

As shown in FIG. 5, fields 505, 510, 515, 520, 525 and 530 may be integrity covered 540 using the ICV contained in ICV field 535. Additionally, payload data field 520, padding field 525, and padding length field 530 may be encrypted 545 using a session layer encryption key. The number and content of the fields of the "large" message format illustrated in FIG. 5 is for illustrative purposes. Other "large" message formats, having fewer, more, and/or one or more different types of fields, than that depicted in FIG. 5 may be implemented.

Figure 6:
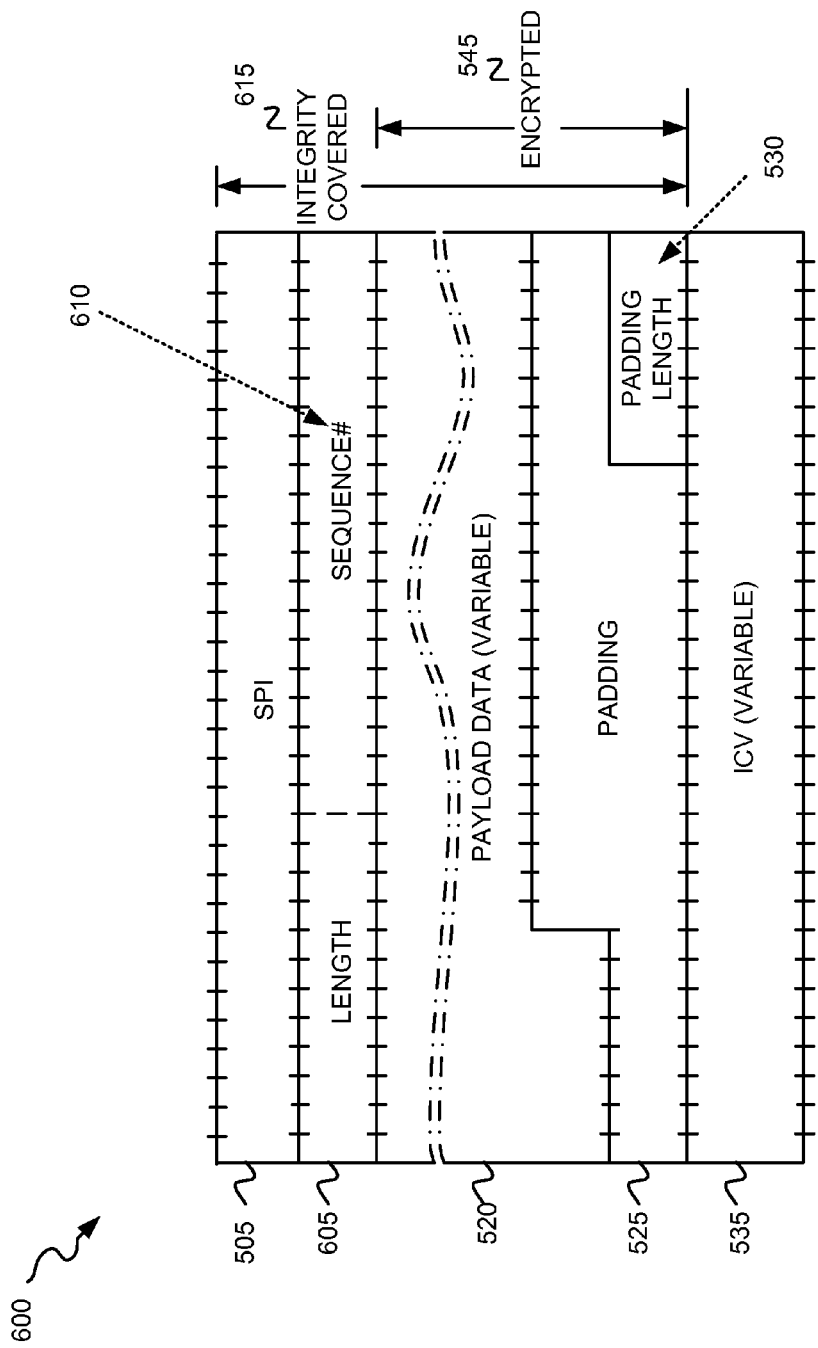
FIG. 6 illustrates an exemplary format of a "compact" session security envelope message block used for communicating between two applications at the session layer.

FIG. 6 illustrates an exemplary format of a "compact" SSE message block 600 used for communicating between two applications at the session layer. Message block 600, in the exemplary "compact" format of FIG. 6, may include a SPI field 505, a length field 605, a sequence number (#) field 610, a payload data field 520, a padding field 525, a padding length field 530, and an integrity check value (ICV) field 535. Fields 505, 520, 525, 530 and 535 each includes the same kind of data content as that included in identically numbered fields described above with respect to FIG. 5.

Length field 605 may specify a bit length of message block 600. Length field 605 may have a length of 12 bits. Sequence number (#) field 610 may indicate a current sequence number assigned to message block 600 within the session of which message block 600 is a part. The sequence number indicated in field 610 may be used for synchronizing the current message block 600 with other messages in the session. The current sequence number stored in field 610 may have a length of 64 bits.

As shown in FIG. 6, fields 505, 605, 610, 520, 525 and 530 may be integrity covered 615 using the ICV contained in ICV field 535. Additionally, payload data field 520, padding field 525, and padding length field 530 may be encrypted 545 using a session layer encryption key. The number and content of the fields of the "compact" message format illustrated in FIG. 6 is for illustrative purposes. Other "compact" message formats, having fewer, more, and/or one or more different types of fields, than that depicted in FIG. 6 may be implemented.

Figure 7:
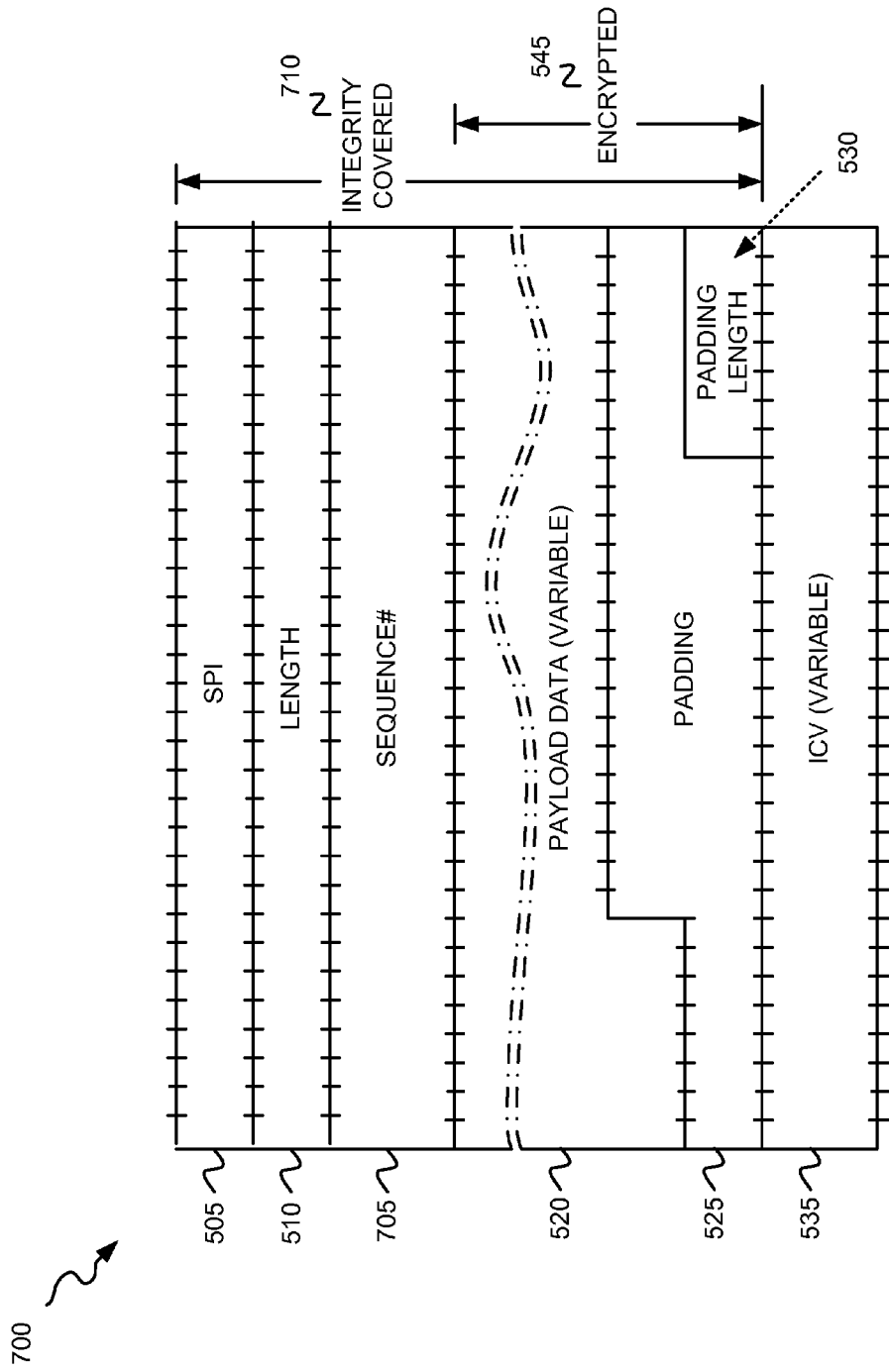
FIG. 7 illustrates an exemplary format of an "extreme" session security envelope message block used for communicating between two applications at the session layer.

FIG. 7 illustrates an exemplary format of an "extreme" SSE message block 700 used for communicating between two applications at the session layer. Message block 700, in the exemplary "extreme" format of FIG. 7, may include a SPI field 505, a length field 510, a sequence number (#) field 705, a payload data field 520, a padding field 525, a padding length field 530, and an integrity check value (ICV) field 535. Fields 505, 510, 520, 525, 530 and 535 each includes the same kind of data content as that included in identically numbered fields described above with respect to FIG. 5.

Sequence number (#) field 705 may indicate a current sequence number assigned to message block 700 within the session of which message block 700 is a part. The sequence number indicated in field 705 may be used for synchronizing the current message block 700 with other messages in the session. In the "extreme" format of SSE message block 700, the sequence number stored in field 705 may have a length of 128 bits.

As shown in FIG. 7, fields 505, 510, 705, 520, 525 and 530 may be integrity covered 710 using the ICV contained in ICV field 535. Additionally, payload data field 520, padding field 525, and padding length field 530 may be encrypted 545 using a session layer encryption key. The number and content of the fields of the "extreme" message format illustrated in FIG. 7 is for illustrative purposes. Other "extreme" message formats, having fewer, more, and/or one or more different types of fields, than that depicted in FIG. 7 may be implemented.

Figure 8:
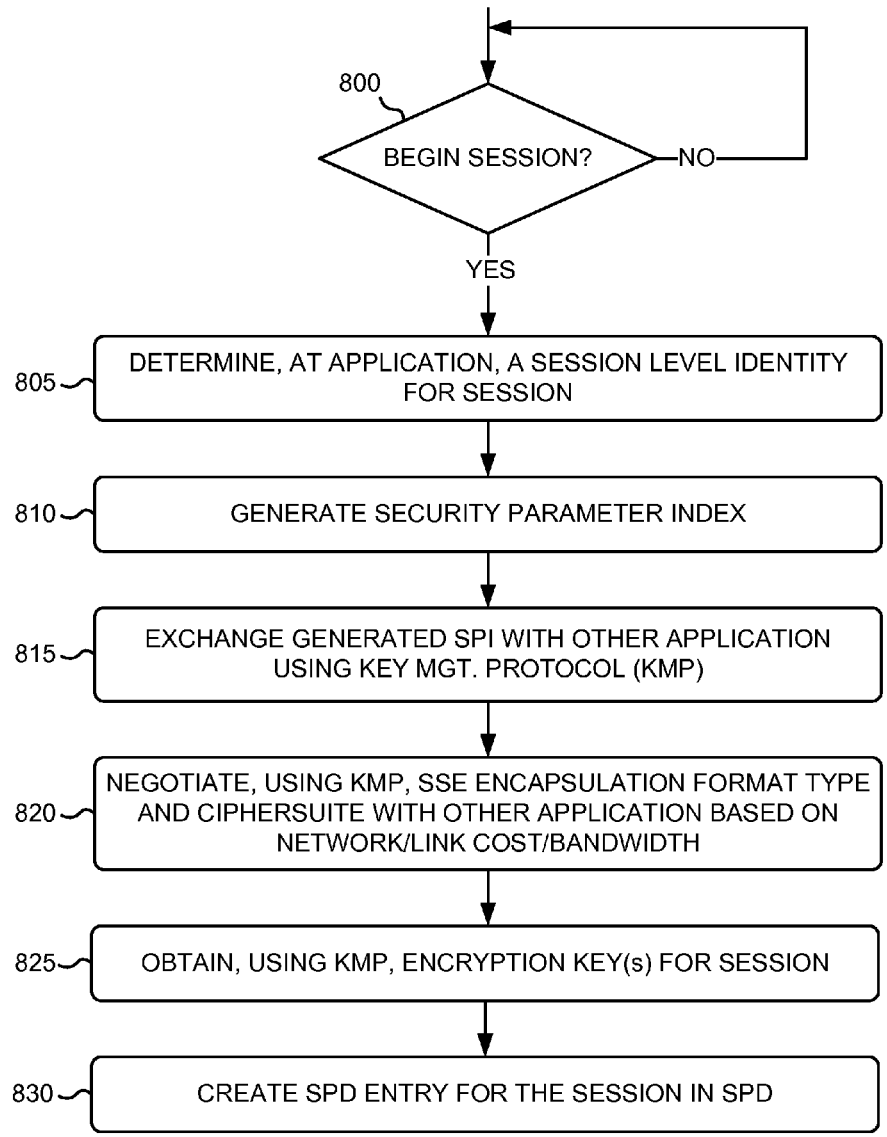
FIG. 8 is a flow diagram of an exemplary process for obtaining security parameters for the session layer security service and for storing those security parameters in the Security Policy Database of FIG. 3.

FIG. 8 is a flow diagram of an exemplary process for obtaining security parameters for the session layer security service and for storing those security parameters in SPD 115. The exemplary process of FIG. 8 may be implemented by device 105. The exemplary process of FIG. 8 is described below with reference to the messaging diagram of FIG. 9.

Figure 9:
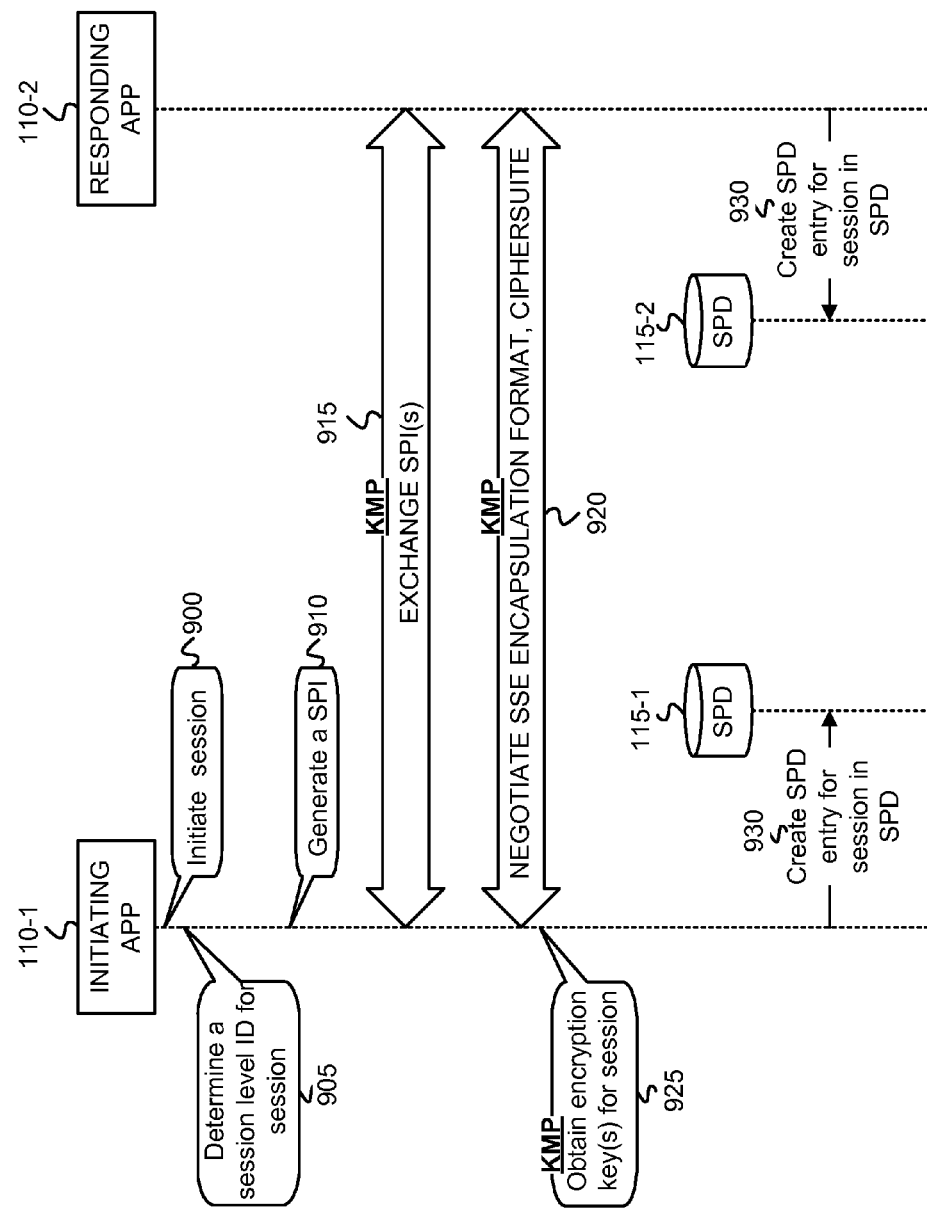
FIG. 9 is an exemplary messaging diagram associated with the exemplary process of FIG. 8.

The exemplary process may include determining if a session between application 110-1 and application 110-2 has begun (block 800). As shown in FIG. 9, application 110-1 at device 105-1, as the initiating application, may initiate 900 a session with application 110-2 at device 105-2. This session may involve the communication of any type of data between application 110-1 and application 110-2, such as, for example, audio or video data, instant messaging data, etc. If a session has begun (YES—block 800), then application 110-1 at device 105-1 may determine a session level identity for the session (block 805). The session level ID may include a unique identifier for identifying the session between app 110-1 and 110-2. Various types of cryptographic algorithms may be applied to any type of identifier for app 110 or device 105 to generate the unique session level ID. The unique identifier may include, for example, data resulting from a cryptographic algorithm applied to a network address of device 105. In some implementations, for example, the network address may include an Internet Protocol (IP) address (e.g., IPv6) of device 105. As the initiating app, app 110-1 may, in one implementation, apply a cryptographic algorithm to device 105-1's IP address to determine the session level ID. FIG. 9 depicts app 110-1 determining 905 a session level ID for the session with app 110-2.

Application 110-1 may generate a security parameter index (SPI) (block 810). The SPI may include a unique bit string that is assigned for the session level ID, and for each transmitting app 110 engaged in the session identified by the session level ID. Each SPI may include a randomly generated bit string that includes, for example, 32 bits. FIG. 9 depicts app 110-1 generating 910 a SPI. Application 110-1 may exchange the SPI generated in block 810 with application 110-2 using a key management protocol (KMP) (block 815). Any type of KMP may be used in block 815 for exchanging the generated SPI with application 110-2, including, for example, Internet Key Exchange (IKE) v2 or Host Identity Protocol (HIP). In multicast implementations, multicast KMP may be used to provide a SPI per transmitter to all members of the multicast group (i.e., application 110-2 is a member of a multicast group with other application not depicted in FIG. 1 or FIG. 9). FIG. 9 depicts app 110-1 exchanging the generated SPI with app 110-2.

Application 110-1 may negotiate, using the KMP, a session security envelope (SSE) encapsulation format type and a ciphersuite with application 110-2 based on a cost or bandwidth associated with network 120, or one or more links of network 120, that connects device 105-1 and device 105-2 (block 820). Device 105-1 and/or device 105-2 may have knowledge of costs or bandwidths associated with network 120, or one or more links of network 120 that interconnect device 105-1 and 105-2 with one another. Application 110-1 and/or application 110-2 may select a SSE encapsulation format type and ciphersuite, for use when sending session layer payload data between app 110-1 and app 110-2, based on the known costs or bandwidths associated with network 120, or the one or more links of network 120. For example, if network 120, or one or more links of network 120, include sufficiently high constraints on cost or bandwidth, then application 110-1 may select the "compact" encapsulation format type of message block 600 shown in FIG. 6. As another example, if network 120, or the links of network 120, permits high bandwidths, then application 110-1 may select the "large" encapsulation format type of message block 500 shown in FIG. 6, or the "extreme" encapsulation format type of message block 700 shown in FIG. 7. The ciphersuite may also be selected by application 110-1 or 110-2 based on the known costs or bandwidths associated with network 120, or one or more links of network 120. FIG. 9 depicts app 110-1 and app 110-2 negotiating 920, using KMP, the SSE encapsulation format and ciphersuite for sending session layer payload data between app 110-1 and app 110-2.

Application 110-1 may obtain, using KMP, an encryption key(s) for the session (block 825). FIG. 9 depicts app 110-1 obtaining 925, using KMP, an encryption key(s) for the session. Application 110-1 may create a SPD entry 300 in SPD 115 for the current session (block 830). The entry may store the session level ID determined in block 805 in session level ID field 305 of entry 300, the SPI generated in block 810 in SPI field 310 of entry 300, the selected encapsulation format type negotiated in block 820 in format type field 315 of entry 300, the selected ciphersuite negotiated in block 820 in ciphersuite field 325 of entry 300, and the encryption key(s) obtained in block 825 in key(s) field 330 of entry 300. FIG. 9 depicts app 110-1 creating 930 an entry in SPD 115-1 for the session. As shown in FIG. 9, application 110-2 may create 930 a corresponding entry in SPD 115-2 for the session with app 110-1.

The exemplary process of FIG. 8 may be repeated for each session initiated by application 110-1.

Figure 10:
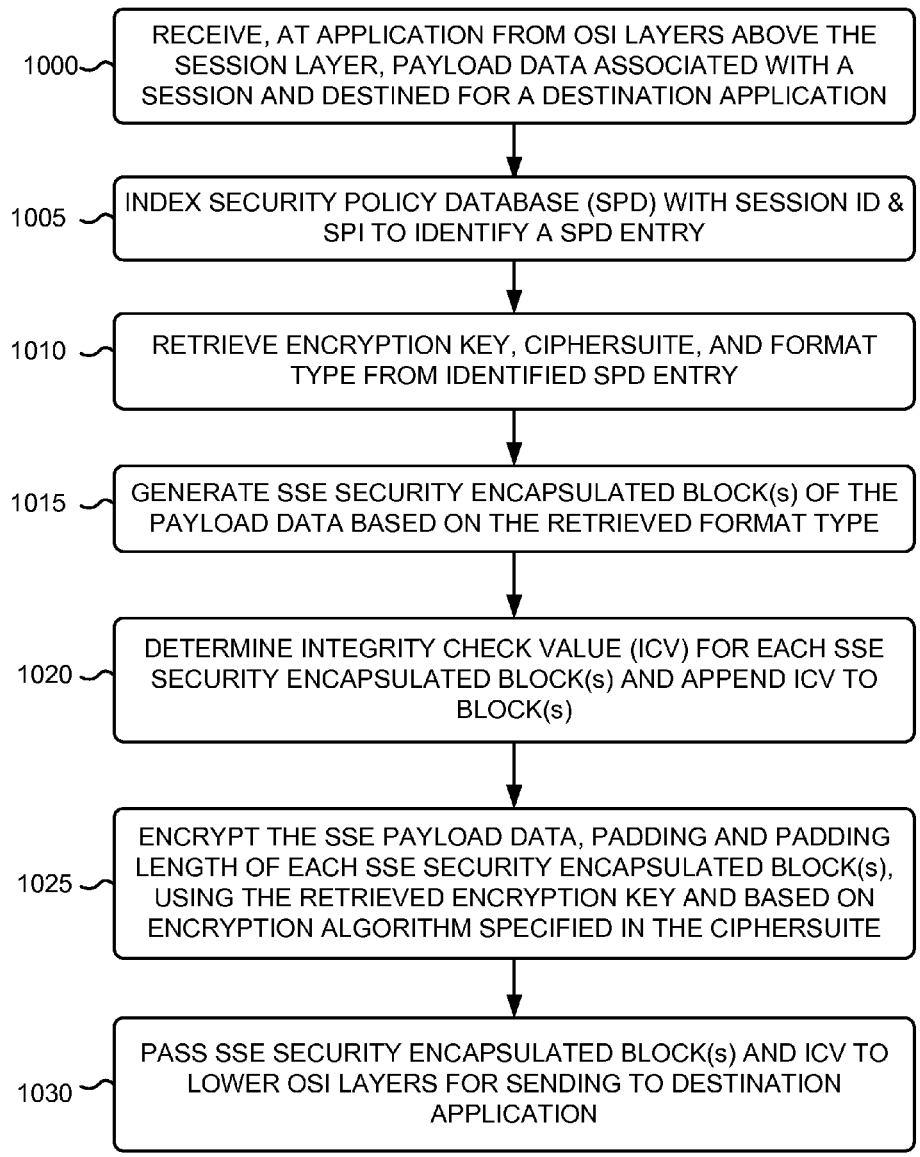
FIG. 10 is a flow diagram of an exemplary process for implementing OSI session layer security protocols for securing session layer data payloads communicated between two applications.

FIG. 10 is a flow diagram of an exemplary process for implementing OSI session layer security protocols for securing session layer data payloads communicated between two applications. The exemplary process of FIG. 10 may be implemented by device 105. The exemplary process of FIG. 10 is described below with reference to the messaging diagram of FIG. 11.

Figure 11:
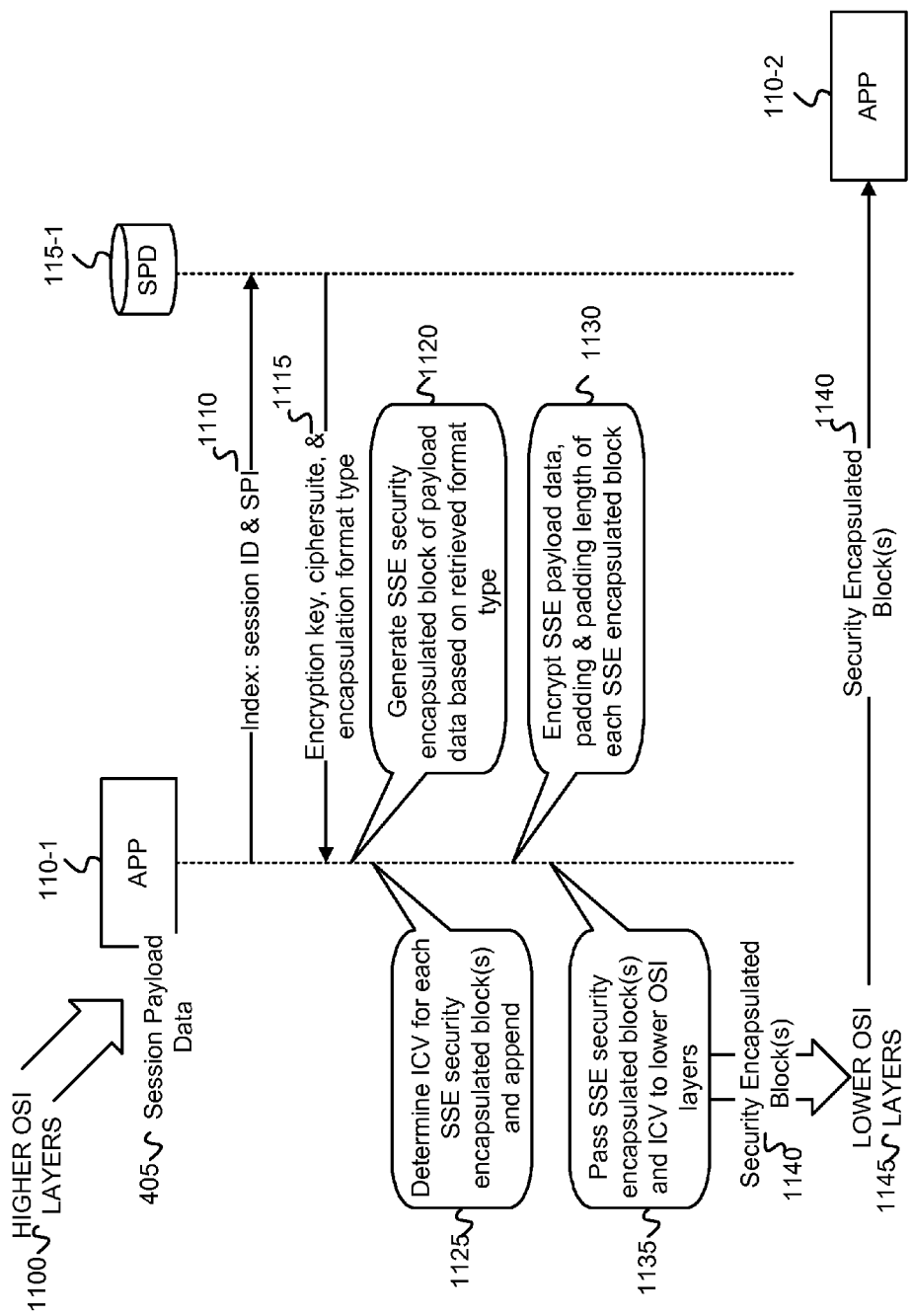
FIG. 11 is an exemplary messaging diagram associated with the exemplary process of FIG. 10.

The exemplary process may include receiving, at application 110, from OSI layers above the session layer, payload data associated with a session and destined for a destination application (block 1000). FIG. 11 depicts session payload data 405 being received from higher OSI layers 1100 at app 110-1. Application 110 may index SPD 115 with an identifier for the session and a SPI to identify an SPD entry 300 (block 1005). Application 110 identifies the session ID for the session of which session payload data 405 is a part. Application 110 may further obtain the SPI based on the destination application to which the session payload data is destined. For example, referring to FIG. 3, application 110 may find an entry 300 having contents of session level ID field 305 that matches the session of the session payload data 405 and which further has contents of SPI field 310 that matches the obtained SPI. FIG. 11 depicts app 110-1 indexing 1110 SPD 115-1 with a session level ID and SPI. Application 110 may retrieve an encryption key, a ciphersuite, and an encapsulation format type from the SPD entry identified in block 1005 (block 1010). Referring to FIG. 3, application 110 may retrieve the contents of key field 330 as the encryption key, the contents of ciphersuite field 325 as the identified ciphersuite, and the contents of format type field 315 as the encapsulation format type. FIG. 11 depicts app 110-1 retrieving 1115 the encryption key, ciphersuite and encapsulation format type from SPD 115-1.

Application 110 may generate a SSE security encapsulated block(s) of the payload data based on the retrieved encapsulation format type (block 1015). Application 110 may encapsulate the session payload data received from the higher OSI layers with a previously selected message block format 500, 600, or 700 identified by the retrieved encapsulation format type in block 1010. The session payload data may be inserted into the message block 500, 600 or 700 in payload data field 520. The SPI from block 1005 may be inserted into the message block 500, 600 or 700 in SPI field 505. The sequence number associated with the session layer message may be inserted into length field 510 or length field 605. The padding data may be inserted into padding field 525, where the padding data is a length such that the session payload data in payload data field 520 plus the padding data in padding data field 525 sum to equal a fixed amount of data. A length of the padding data may further be inserted into padding length field 530. A bit length of message block 500, 600 or 700 may be inserted into length field 510 or 605. FIG. 11 depicts app 110-1 generating 1120 a SSE security encapsulated block of payload data based on the retrieved format type.

Application 110 may determine an integrity check value (ICV) for each SSE security encapsulated block(s) and may append the ICV to the block(s) (block 1020). The ICV for each SSE security encapsulated block(s), that corresponds to a message block 500, 600 or 700, may be generated based on the contents of fields 505-530 of message block 500; fields 505, 605, 610 and 520-530 of message block 600; or fields 505, 510, 705, 520, 525 and 530 of message block 700. Various different cryptographic integrity checking algorithms may be used to generate the ICV value, such as, for example, CBC-MAC algorithm. The determined ICV may be appended to message block 500, 600 or 700 in ICV field 535. FIG. 11 depicts app 110-1 determining 1125 an ICV for each SSE security encapsulated message block and appending the ICV to the message block.

Application 110 may encrypt the SSE payload data, padding, and padding length of each SSE security encapsulated block(s) using the retrieved encryption key and based on an encryption algorithm specified in the ciphersuite (block 1025). Application 110 may encrypt payload data field 520, padding field 525 and padding length field 530 of message blocks 500, 600 or 700 using an encryption algorithm specified in the ciphersuite, and using the retrieved encryption key. FIG. 11 depicts application 110-1 encrypting 1130 the SSE payload data, padding and padding length of each encapsulated message block. Application 110 may pass the SSE security encapsulated block(s) and ICV to lower OSI layers for sending to the destination application (block 1030). FIG. 11 depicts application 110-1 passing 1135 the security encapsulated message block 1140 and ICV to lower OSI layers 1145. The lower OSI layers 1145 may operate to send the security encapsulated message block 1140 of the session layer to application 110-2 for decapsulation. The exemplary process of FIG. 10 may be repeated for each block of session payload data received at the session layer from higher OSI layers.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with respect to FIGS. 8 and 10, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   selecting, at a first application at a first device, one of a plurality of encapsulation format types based on a cost or bandwidth associated with a network, or associated with a link of the network, connected between the first application at the first device and a second application at a second device,
      wherein each of the plurality of encapsulation format types comprises session layer encapsulation having different quantities of data overhead, and
      wherein the plurality of encapsulation format types comprise a first encapsulation format type having a first quantity of data overhead and a second encapsulation format type having a second quantity of data overhead, wherein the first quantity of data overhead is greater than the second quantity of data overhead;
   receiving, at the first application from Open Systems Interconnection (OSI) layers above an OSI session layer, payload data associated with a session;
   generating one or more session layer encapsulated blocks of the payload data using the selected one of the plurality of encapsulated format types;
   encrypting the payload data, and other data of the one or more session layer encapsulated blocks; and
   passing the encrypted session layer encapsulated block to OSI layers below the session layer for sending to the second application.

2. The method of claim 1, wherein the session comprises a sequence of data units between the first application and the second application.

3. The method of claim 1, wherein the plurality of encapsulation format types further comprise a third encapsulation format type having a third quantity of data overhead, where the third quantity of data overhead is greater than the first quantity of data overhead and the second quantity of data overhead.

4. The method of claim 1, further comprising:
   indexing a security policy database with a session identifier to retrieve data that selects the one of the plurality of encapsulation format types.

5. A device, comprising:
   a communication interface connected to a network;
   a processing unit configured to execute a first application and to:
      select one of a plurality of encapsulation format types based on a cost or bandwidth associated with the network, or associated with a link of the network, connected between the first application at the first network device and a second application at a second network device, wherein each of the plurality of encapsulation format types comprises session layer encapsulation having different quantities of data overhead, and
wherein the plurality of encapsulation format types comprise a first encapsulation format type having a first quantity of data overhead and a second encapsulation format type having a second quantity of data overhead, wherein the first quantity of data overhead is greater than the second quantity of data overhead,
receive, at the first application from Open Systems Interconnection (OSI) layers above a OSI session layer, payload data associated with a session, wherein the session comprises a sequence of data units between the first application and the second application,
generate one or more session layer encapsulated blocks of the payload data using the selected one of the plurality of encapsulated format types;
encrypt the payload data, and other data of the one or more session layer encapsulated blocks; and
pass the encrypted session layer encapsulated block to OSI layers below the session layer for sending to the second application via the communication interface.

6. The device of claim 5, wherein the device comprises a cellular telephone, a personal digital assistant (PDA), or a tablet, desktop, palmtop, or laptop computer.

7. The device of claim 5, wherein the plurality of encapsulation format types further comprise a third encapsulation format type having a third quantity of data overhead, where the third quantity of data overhead is greater than the first quantity of data overhead and the second quantity of data overhead.

8. The device of claim 7, wherein the plurality of encapsulation format types further comprise a fourth encapsulation format type having a fourth quantity of data overhead, where the fourth quantity of data overhead is greater than the first quantity of data overhead, the second quantity of data overhead, and the third quantity of data overhead.

9. The device of claim 5, wherein the processing unit is further configured to execute the first application and to:
index a security policy database with a session identifier to retrieve data that selects the one of the plurality of encapsulation format types.

10. A method, comprising:
determining, at a first application at a first device, a session identity for a session between the first application and a second application at a second device;
generating a security parameters index (SPI) for the session;
negotiating, between the first application and the second application, a selected session layer encapsulation format type, from among multiple different session layer encapsulation format types, based on a cost or bandwidth associated with a network, or associated with a link of the network, connected between the first device and the second device,
wherein each of the multiple different session layer encapsulation format types comprises session layer encapsulation having different quantities of data overhead, and
wherein the multiple different session layer encapsulation format types comprise a first encapsulation format type having a first quantity of data overhead and a second encapsulation format type having a second quantity of data overhead, wherein the first quantity of data overhead is greater than the second quantity of data overhead; and
creating an entry for the session in a security policy database (SPD), wherein the entry includes the session identity, the SPI, and the selected session layer encapsulation format type.

11. The method of claim 10, further comprising:
exchanging the SPI with the second application.

12. The method of claim 10, further comprising:
negotiating, between the first application and the second application, a ciphersuite for encrypting data session layer data between the first application and the second application.

13. The method of claim 12, further comprising:
obtaining, at the first application based on the negotiated ciphersuite, an encryption key for the session.

14. The method of claim 10, further comprising:
obtaining, at the first application, an encryption key for the session.

15. The method of claim 10, further comprising:
negotiating, between the first application and the second application, a ciphersuite for encrypting data session layer data between the first application and the second application;
obtaining, at the first application based on the negotiated ciphersuite, an encryption key for the session,
wherein the entry for the session in the SPD further includes the ciphersuite and the encryption key.

16. A device, comprising:
one or more communication interfaces connected to a network and to a security policy database (SPD);
a processing unit configured to execute a first application and to:
determine, by the first application, a session identity for a session between the first application and a second application at a second device,
generate a security parameters index (SPI) for the session,
negotiate, between the first application and the second application via the one or more communication interfaces, a selected session layer encapsulation format type, from among multiple different session layer encapsulation format types, based on a cost or bandwidth associated with a network, or associated with a link of the network, connected between the first device and the second device,
wherein each of the multiple different session layer encapsulation format types comprises session layer encapsulation having different quantities of data overhead, and
wherein the multiple different session layer encapsulation format types comprise a first encapsulation format type having a first quantity of data overhead and a second encapsulation format type having a second quantity of data overhead, wherein the first quantity of data overhead is greater than the second quantity of data overhead,
create an entry for the session in a SPD, wherein the entry includes the session identity, the SPI, and the selected session layer encapsulation format type.

17. The device of claim 16, wherein the processing unit is further configured to:
exchange, via the one or more communication interfaces, the SPI with the second application.

18. The device of claim 16, wherein the processing unit is further configured to:
negotiate, between the first application and the second application via the one or more communication interfaces, a ciphersuite for encrypting data session layer data between the first application and the second application.

19. The device of claim 18, wherein the processing unit is further configured to:
   obtain, at the first application based on the negotiated ciphersuite, an encryption key for the session.

20. The device of claim 16, wherein the processing unit is further configured to:
   obtain, at the first application, an encryption key for the session.

21. The method of claim 16, wherein the processing unit is further configured to:
   negotiate, between the first application and the second application, a ciphersuite for encrypting data session layer data between the first application and the second application;
   obtain, at the first application based on the negotiated ciphersuite, an encryption key for the session,
   wherein the entry for the session in the SPD further includes the ciphersuite and the encryption key.

22. The method of claim 10, wherein the multiple different session layer encapsulation format types further comprise a third encapsulation format type having a third quantity of data overhead, where the third quantity of data overhead is greater than the first quantity of data overhead and the second quantity of data overhead.

23. The method of claim 22, wherein the multiple different session layer encapsulation format types further comprise a fourth encapsulation format type having a fourth quantity of data overhead, where the fourth quantity of data overhead is greater than the first quantity of data overhead, the second quantity of data overhead, and the third quantity of data overhead.

24. The device of claim 16, wherein the multiple different session layer encapsulation format types further comprise a third encapsulation format type having a third quantity of data overhead, where the third quantity of data overhead is greater than the first quantity of data overhead and the second quantity of data overhead.

25. The device of claim 24, wherein the multiple different session layer encapsulation format types further comprise a fourth encapsulation format type having a fourth quantity of data overhead, where the fourth quantity of data overhead is greater than the first quantity of data overhead, the second quantity of data overhead, and the third quantity of data overhead.

* * * * *